United States Patent [19]

Suggs

[11] Patent Number: 5,316,319
[45] Date of Patent: May 31, 1994

[54] LIVELOAD ASSEMBLY FOR MAINTAINING TORQUE ON BOLTS

[75] Inventor: Steven M. Suggs, Atlanta, Ga.

[73] Assignee: RM Engineered Products, Inc., North Charleston, S.C.

[21] Appl. No.: 949,167

[22] Filed: Sep. 22, 1992

[51] Int. Cl.⁵ .................. B65D 53/04; F16B 43/02; F16F 1/34

[52] U.S. Cl. .................. 277/106; 411/544; 411/155; 411/917; 267/162; 251/214

[58] Field of Search .............. 277/9.5, 10, 11, 105, 277/106, 186; 441/9, 10, 11, 155, 156, 535, 536, 544, 916, 917; 267/161, 162, 164, 294; 251/214

[56] References Cited

U.S. PATENT DOCUMENTS

| | | |
|---|---|---|
| 2,830,486 | 4/1958 | Dillon ........................ 411/9 |
| 2,983,121 | 5/1961 | Naas ...................... 267/162 X |
| 3,113,755 | 12/1963 | Stevens et al. .......... 267/162 X |
| 3,873,079 | 3/1975 | Kuus ......................... 267/162 |
| 3,968,970 | 7/1976 | Vogeli ....................... 277/106 |
| 4,106,170 | 8/1978 | Schoeneweis ............. 29/157.1 |
| 4,394,872 | 7/1983 | Schobl ........................ 137/315 |
| 4,571,133 | 2/1986 | Lindow ..................... 411/11 |
| 4,651,981 | 3/1987 | Passinieni ................. 267/162 |
| 5,024,453 | 6/1991 | Suggs ........................ 277/106 |
| 5,090,087 | 2/1992 | Hipple et al. ........... 277/106 X |
| 5,180,268 | 1/1993 | Richardson ............... 411/536 |
| 5,190,264 | 3/1993 | Boger ......................... 251/214 |
| 5,192,049 | 3/1993 | Ridge ..................... 277/106 X |

FOREIGN PATENT DOCUMENTS

| | | | |
|---|---|---|---|
| 0422342 | 4/1991 | European Pat. Off. ........... 277/106 |
| 0303307 | 12/1989 | Japan ...................... 411/544 |
| 0003669 | of 1911 | United Kingdom ............... 277/106 |

Primary Examiner—William A. Cuchlinski, Jr.
Assistant Examiner—John L. Beres
Attorney, Agent, or Firm—Kennedy & Kennedy

[57] ABSTRACT

A liveload assembly having a stack guide with a thread on the exterior side wall, a plurality of compressible belleville washers stacked inside the stack guide, and a retainer cap having a thread on an inner side wall for matingly engaging with the stack guide to hold the belleville washers in compression. The gland follower of a fluid flow apparatus is liveloaded by placing the liveload assembly over the bolt extending upwardly from the gland follower. A nut is threaded on the bolt to contact the stack of belleville washers and the retainer cap is unscrewed to a second position on the stack guide and fixed by turning a set screw through a bore in the cap and against the side of the stack guide. Compression of the gland follower is monitored by viewing the relative movement of the stack of belleville washers through a longitudinal slot in the side wall.

5 Claims, 2 Drawing Sheets

LIVELOAD ASSEMBLY FOR MAINTAINING TORQUE ON BOLTS

TECHNICAL FIELD

The present invention relates to an apparatus for maintaining torque on bolts. More particularly, the present invention relates to a liveload assembly of belleville washers held in compression for applying force to a bolt to maintain torque.

BACKGROUND OF THE INVENTION

Nuts and bolts are threaded fasteners which screw together, or into threaded bores, under high torque to rigidly join parts together. For example, bolts connect pipe flanges together, hold caps on pressure vessels, and secure gland followers in the stuffing box of fluid flow equipment as discussed below. In some circumstances, the torque reduces and the fastener loosens. Equipment vibration, stretching due to heat and pressure, and compression of gaskets and packing may cause the bolt to loosen. Maintaining the torque on bolts is particularly important with fluid flow equipment. The torqued bolts prevent fluid leaks from such equipment, as discussed below.

Fluid flow equipment including pipes, valves, and pumps are common in the utility, refinery, manufacturing, chemical and petrochemical industries. The mechanical workings of such valves and pumps are housed in casings through which rotary or reciprocating shafts extend. For example, the shaft of a rotary pump operatively connects a motor on the exterior of the casing to an impeller on the interior of the casing. The shafts rotate or reciprocate in response to a number of specific stimuli, including a knob turned by hand, a motor, or an impeller driven by fluid flowing in the equipment.

Thus, there are at least three openings in a pump or valve casing: (1) an opening for an inlet pipe by which fluid is delivered; (2) an opening for an outlet pipe by which fluid is discharged; and (3) an opening for the shaft. Various types of seals prevent leakage of fluid from the pump or valve casing. The two fluid openings for the inlet and the outlet pipes are sealed conventionally. The shaft projects through the casing in an area known as the "stuffing box" or the "packing box". The terms "stuffing box" and "packing box" are interchangeable, and derive from the method of preventing fluid leakage by stuffing or packing a material around the shaft to provide the seal. The packing material is often composed of woven or braided fibers formed into coils, spirals or rings. The packing material is stuffed around the shaft so that no fluid can escape the casing along the shaft. A lubricant is often impregnated in the packing material to facilitate installation and to reduce friction on the packing material.

Rotary and reciprocating shaft-equipped pumps, valves, compressors, agitators and the like, interact with a variety of fluids. Such fluids may be as harmless as cool water or as dangerous as a radioactive, superheated acid. Preventing leakage of any fluid from the opening for the shaft is important. The cost of any such leakage can range from the loss of fluid and operating time for repair of the leak, to significant environmental damage and loss of life.

For example, consider a pump in a nuclear fueled steam generating plant. In nuclear reactors, pumps are used to circulate a coolant (oftentimes water) across nuclear fuel elements. The coolant and nuclear fuel are placed together in a pressure vessel. Piping from the pressure vessel delivers the coolant, heated by contact with the nuclear fuel, to a heat exchanger. The heat exchanger extracts the heat from the coolant. The piping thus forms a continuous loop between the pressure vessel and the heat exchanger so that the coolant is continuously recycled. As a result, radioactivity is safely contained within this closed system. Pumps are often provided between the pressure vessel and the heat exchanger to deliver the coolant. Any leakage from the pump destroys the closed system and permits radioactive coolant to escape. Failure of a seal in this example will not only result in the discharge of a toxic material into the environment, but could cause an explosion or fire.

In addition to actual damage caused by leaks, profits and the health and welfare of employees are affected. Many industrial processes require large amounts of time to regain normal operation. Frequent shutdowns of the process greatly affect production capability. Thus, having to shut down a plant for any period of time in order to replace worn or damaged packing in the stuffing box reduces operating time and, correspondingly, reduces profit. Moreover, workers are often at risk in replacing such worn packing. For example, the packing in a pump and valve becomes saturated with the fluid being sealed. The packing in a pump used to circulate coolant in a nuclear reactor will be exposed to radioactivity from the coolant. A worker who removes old and worn packing from such a pump is, for a time, exposed to the radiation contained in the fluid and saturated in the packing. Accordingly, frequent replacement of the packing material in the stuffing box is not desirable. Moreover, it is preferred that all steps be taken to minimize the risk of such radiation exposure.

Rotating and reciprocating shafts are difficult to seal. In operation, such shafts are capable of both radial and axial displacement. Radial displacement typically results form manufacturing inaccuracies. Axial displacement results from different thermal expansions produced through normal operation of the shaft. Furthermore, the stuffing box environment is less than ideal. Conditions are constantly changing. The packing may be required to withstand high temperatures and pressures one minute and low temperatures and pressures the next. Shaft speeds may also vary. The surfaces of the shaft in the stuffing box are often pitted and rough. Very slight defects in the arrangement or condition of a stuffing box can prevent proper pump operation.

Various types of packing for a stuffing box are known in the prior art. Each of these packings attempts to be responsive to the foregoing considerations. The packing must be somewhat plastic so that it can extrude enough to seal rough or uneven surfaces. The packing must be resilient in order to adapt to changing conditions without failing or damaging the shaft. However, in trying to provide flexibility, some packings sacrifice resiliency. Others, in trying to resist extrusion, sacrifice flexibility sufficient to conform to uneven or rough surfaces within the stuffing box. Still other packings are flexible, resilient and minimize friction, but do not provide a long-lasting seal so as to avoid frequent replacement.

Soft packing is a common shaft seal, and is generally made from asbestos (generally no longer used), fabric, hemp or rubber fibers woven into strands and formed into a braided spiral. Soft packing is inexpensive and offers several desirable features. The softness of the packing allows it to absorb energy without damaging the rotating shaft. Soft packing is also very flexible and readily conforms to the area to be sealed.

Soft packing, however, has several disadvantages. One problem is short life. Soft packing is easily worn by friction and easily damaged, therefore requiring frequent replacement. Soft packing may be impregnated with graphite or lubricating oils to reduce friction between the shaft and the packing, but such lubricants quickly dissipate and are not very effective in overcoming the short life problem. Thus, soft packings are best suited for low shaft speed applications involving non-caustic and non-abrasive fluids. Yet another problem with soft packing is a lack of resiliency. After being compressed and extruded, soft packings are unable to re-expand to effectuate a seal. Resiliency, conventionally defined as the ability of packing to re-expand, is important to enable the packing material to adjust to changing conditions. Lack of such resiliency, as in the case of a soft packing, results in frequent adjustment or replacement for the packing.

U.S. Pat. No. 3,404,061 teaches a sealing material made from expanded graphite. One common use of such material is to wind a length of flexible tape made therefrom onto a mandrel to form a solid annulus of appropriate size to pack the stuffing box. Thus, the expanded graphite tape is formed as a seal. Packing made from expanded graphite is flexible and conforms to uneven surfaces. The graphite material makes the packing self-lubricating, thereby minimizing friction between the shaft and the packing. With such self-lubricating packings, the lubricant does not dissipate with time. Expanded graphite packing also absorbs energy without excessive damage to either the packing or the shaft.

The principal problem with expanded graphite packings is a lack of resiliency and excessive extrusion under high temperatures and pressures. Solid graphite packings are not able to withstand high pressures since they lack the internal strength to resist extrusion and are unable to re-expand after compression. In addition, expanded graphite packings require frequent adjustment under normal conditions due to the low resiliency of the graphite. The graphite packings are easily compressed, thereby contributing to the low resiliency problem. As a result, normal rotation or reciprocation of the shaft can compress the graphite and create leaks.

A further problem with soft packings (and expanded graphite packing in particular) is that they are difficult to extract from the stuffing box when replacement is necessary. Soft packing can extrude to such an extent that it melds to the walls of the stuffing box, making removal difficult. Those skilled in the art will appreciate that the typical stuffing box provides an annular recess about the shaft, into which the packing is stuffed. The recess is capped by a gland follower. The gland follower is secured to the casing, known as the gland of the stuffing box, by one or more bolts. Thus, the more torque applied to the gland bolts, the greater the downward pressure applied to the packing by the gland follower. Tightening the gland bolts compresses the packing in the stuffing box to effect the seal.

Generally speaking, there are three conditions that result in leakage: packing consolidation; bolt creep; and improper loading.

Packing consolidation occurs naturally, and refers to the packing's tendency to settle, wear, and loosen over time. A number of factors contribute to this condition, including the constant rotation of the shaft, changes in temperature of fluids flowing through the equipment, and the age and material of the packing itself. Soft packing is particularly susceptible to consolidation.

Bolt creep is a condition wherein the gland bolts are moved upward due to the expansion and contraction of the gland follower and the casing. Such expansion and contraction often results from a change in operating temperatures and pressures. Valves and pumps in various industries often operate under conditions ranging from cryogenic to superheated temperatures, and normal to extreme pressures and vacuums. Bolt creep reduces the pressure applied by the gland follower on the packing.

Improper loading is a condition wherein the compression exerted by the gland follower on the packing is insufficient to effect a seal. Packing consolidation and bolt creep are contributing elements of improper loading, because both reduce the compressive force applied by the gland follower on the packing. But inaccurate torquing of the gland bolts by workers also causes improper loading. Such inaccurate torquing may be the result of human errors. However, it is recognized that the torque wrenches used by workers are often inaccurate, resulting in improper loading. Leaks thus occur from the outset because the load on the packing is insufficient to achieve or maintain a seal.

Fluid leakage along the shaft of valves and pumps has long been recognized as serious problem in power and industrial plants. In recognition of this problem, various attempts have been made to obtain leak-free performance and reduce maintenance requirements for a pump or a valve. For example, improved packing materials were developed for a large range of temperatures, better chemical resistance, and improved coefficient of expansion characteristics. Torque values were established for the bolts connecting the gland follower to the stuffing box. (Installers follow such specifications to apply a proper load to the packing to achieve a seal, but as discussed above, may not attain a proper load because the torque wrenches are inaccurate.) Several companies have initiated routine maintenance programs that include re-torquing of gland follower bolts. Such retorquing is done frequently because of the significant risk posed by improperly loaded gland bolts and the resulting leakage of fluid form the apparatus. The costs of repairing damaged equipment and cleaning up spend fluids are also of concern, but generally, the majority of the equipment does not need such maintenance. Such maintenance programs include all equipment, however, in order to correct the torque on the relatively few pieces of equipment for which packing compression is lessened (as a result of bolt creep, packing consolidation or previous improper loading) to an extent that leaking has occurred or could occur.

Another attempt to obtain leak-free performance and reduce maintenance requirements involves liveloading of the gland follower. Liveloading refers to the mounting of compressed springs on the gland follower whereby a constant pressure is exerted on the gland follower to insure a constant compressive force is exerted on the packing. As the packing consolidates or the gland bolts loosen, the spring pressure moves the gland follower towards the stuffing box to maintain the integrity of the packing.

Belleville washers are one type of spring typically used to cushion heavy loads with short motion. Uncompressed belleville springs or washers typically take the form of a disk with an open center. In contrast, compressed belleville washers are flat. A significant amount of force is required to compress or flatten the uncompressed belleville washers. Belleville washers installed on the gland bolts of pump and valve stuffing boxes maintain the force exerted by the gland follower on the packing. As the packing consolidates or the gland bolts loosen, the belleville washers decompress and maintain the load on the packing. The gland follower essentially becomes self adjusting in response to the packing's condition to maintain a proper load on the packing and thereby maintain a seal.

Liveloading a gland follower is difficult in many situations. It is particularly difficult to retrofit valves for liveloading for a number of reasons. Replacement of bolt studs may be necessary because the studs are not long enough to accommodate a sufficient number of uncompressed belleville washers and the nut that conventionally maintains the gland follower. Those skilled in the art will appreciate that uncompressed belleville washers occupy more space than compressed washers. Accordingly, the gland bolts must often be extruded and replaced with longer bolts. This is particularly expensive in nuclear power plants, not only because expensive high grade steel material must be used to manufacture the extended bolts, but also because a significant amount of paper work detailing the change must be prepared and filed with the various regulatory agencies and manufacturers involved with the equipment and nuclear power plants. Also, health and safety inspectors at nuclear plants track carefully the amount of radiation to which workers are exposed because there is a limit to the amount of radiation a worker may receive. Additional workers thus may be needed for simple, yet time-consuming projects.

Another reason that liveloading is difficult is because achieving the right load on the belleville washers is expensive and difficult. The retaining nut must be torqued on the bolt to a specific degree to achieve and maintain a seal. Proper torquing of the washers, even using torque wrenches, takes a long time. In a nuclear plant, any additional maintenance time increases the workers' exposure to radiation form the fluid. Torque wrenches are recognized as inherently inaccurate. Engineers at nuclear plants in particular are uncomfortable relying on such tools to achieve a proper torque.

Yet another reason that liveloading is difficult is because belleville washers are difficult to install about a gland bolt. Aside from being a time consuming operation, the component washers are small in size and difficult to manipulate. Workers in heavily radiated areas must wear several sets of gloves and a respirator. Gloves make such small objects difficult to handle and position over a bolt. The respirator makes it difficult to see. If a single belleville washer is dropped and lost, work may be delayed for hours.

A further reason that liveloading is difficult is that belleville washers, once placed on a gland bolt and even when properly torqued, may slip laterally and hang or catch on the bolt. This causes hysteresis, a retardation of the self-adjusting effect of the belleville washers on the gland follower.

U.S. Pat. No. 5,024,453 issued to Suggs describes a liveload assembly for rotary or reciprocating shaft packing. The liveload assembly includes a cylindrical stack guide with a thread on the inner surface. Compressible belleville washers are stacked in the stack guide for compression to a predetermined load typically under hydraulic force. A retainer made as a cylinder having a thread on the exterior surface matingly joins the stack guide to retain the belleville washers in compression. For use, the liveload assembly is placed on the bolt extending through the gland follower from the housing of the stuffing box. A nut having a diameter less than the inner diameter of the retainer is threaded by hand onto the bolt to contact the stack of belleville washers. A socket or wrench is then used to rotate the nut about one additional turn. The retainer is then freely removed from the stack guide for disposal.

While operative for its intended purpose, the liveload assembly described above has several drawbacks which limits its utility. In some instances, the proper deep-well socket necessary to fit over the nut and reach fully down into the stack guide was unavailable in power plants, refineries, and the other facilities seeking to use the liveload assembly. It would be preferable and more convenient to use simple wrenches, but the structure did not facilitate the use of such wrenches for reaching easily and deeply into the well defined by the retainer. In other cases, the diameter of the socket was simply too great to fit within the clearance between the outside surface of the nut and the interior wall of the retainer. Typically, this clearance problem occurred with smaller pumps or valves. The small clearance prevented the socket from fitting into the well.

Small valves have a further problem of lacking space on top of the valve for positioning the liveload assembly. Both small and large valves sometimes include other components on the top that restrict the axial space available for the liveload assembly. Such components include a yoke, a stem coupling, or an actuator to move the valve stem during automatic operation.

One purpose of the above described liveload assembly is to reduce the number of gland bolts that have to be replaced with longer bolts to accommodate belleville washers. Replacement of gland bolts requires additional labor and time, expensive parts, and extensive documentation of the change to a longer bolt. Documentation is particularly difficult and critical in nuclear power plants. Various regulatory approvals must be obtained and engineering drawings and specifications updated. The structure described above, however, includes a stack guide large enough to receive a stack of uncompressed belleville washers and the matingly threaded retainer that extends upwardly from the stack guide. Although many gland bolts may no longer require replacement, a compact liveload assembly would be more readily received. A compact liveload assembly would also fit on more of the smaller valves which may lack axial space as discussed above.

After installation of the liveload assembly, the removed retainer was thrown away, and this disposal requirement caused other problems. Generally it offends a sense of economy to throw away a metal part, particularly one of high quality metal with expensive machining. For nuclear power plants, disposal was a significant problem. Any part used in an irradiated area can only be disposed in a special facility capable of handling nuclear hazardous waste. Disposal of such waste requires expensive and specialized handling. Also a disposed part is not available for later use. For example, should a need arise to repack or repair the fluid flow apparatus, the service technician would have to locate a retainer sized for the particular liveload assembly in order to remove the assembly.

Thus, there exists a need in the art for a compact apparatus for liveloading a bolt that is free of the problems typically experienced when liveloading fluid flow apparatus such as valves, pumps and the like in power and industrial plants.

SUMMARY OF THE PRESENT INVENTION

The present invention overcomes the problems in the art to provide a compact liveload assembly including belleville washers precompressed to a predetermined load for installation on a bolt, for example a gland bolt. Generally described, the liveload assembly of the present invention includes a stack guide and a plurality of belleville washers stacked inside the stack guide. A retainer cap in a first position holds the compressed washers in the stack guide until the liveload assembly is installed. The retainer cap is then moved to a second position on the stack guide for indicating when retorquing of the bolt is required.

The preferred stack guide is a cylinder with an open top end and a bottom end with seat that defines an aperture coaxial with the longitudinal axis of the cylinder. The aperture is sized to permit the stack guide to pass over the gland bolt of the fluid flow equipment on which the liveload assembly is to be installed. The outside wall of the stack guide is threaded from the top end towards the bottom end. A slot in the sidewall of the stack guide extends downwardly from the open end towards the bottom end. The slot permits visual checking of the compressed washers as an indicator showing the extent to which the washers have decompressed during use of the liveload assembly.

The stack guide receives the plurality of belleville washers, each washer formed with a center opening of suitable dimension for receiving the gland bolt therethrough.

The preferred retainer cap is an open ended cylinder having a threaded interior side wall surface and an integral annular plate at an upper end defining an opening. The retainer is sized so as to be threadably received by the stack guide, thereby holding the belleville springs in compression within the stack guide. The opening is of sufficient diameter to permit a gland bolt to pass therethrough for receiving a nut.

The liveload assembly of the present invention is preferably assembled by stacking uncompressed belleville washers inside the stack guide. The belleville washers are then compressed. The washers are held compressed in the stack guide by threading the retainer onto the stack guide. The longitudinal slots align to define an opening to view the relative movement of the belleville washers. A set screw threadably passes through a bore in the retainer cap to fix the retainer cap in the first and second positions. In the first position, the retainer cap holds the belleville washers in compression. In the second position, a groove on the retainer cap provides a noticeable indicator mark for comparing relative movement of the belleville washers. When sufficient movement has occurred, the bolt must be retorqued.

The liveload assembly is preferably installed by sliding the assembly over a gland bolt threaded into the gland follower. A nut is threaded onto the bolt until it contacts the compressed belleville washers in the assembly. A wrench is used to turn the nut about one half to about one full turn. This rotation causes the nut to further partially compress the belleville washers. The retainer cap is then freely tunable on the stack guide. The retainer cap is then moved to the second position on the stack guide away from contact with the belleville washers. The retainer cap is fixed in the second position by screwing the set screw through the bore firmly against the side of the stack guide.

The gland follower, and hence, the packing in the stuffing box, is thereby liveloaded by the compressed belleville washers. As the gland follower travels over time towards the casing, the stack guide moves with respect to the gland bolt. The compressed belleville washers are viewed through the slots. Relative movement of the washers is judged against the groove mark on the retainer cap. When the upper-most belleville washer reaches a predetermined position, the gland nut is turned to retorque or recompress the belleville washers and thereby maintain a proper force on the gland follower and, in turn, on the packing in the stuffing box.

Accordingly, it is an object of the present invention to provide a liveload assembly having compressed belleville washers preloaded in an assembly for installation on a bolt.

It is another object of the present invention to provide a liveload assembly that permits a gland follower to be preset to a predetermined torque.

It is another object of the present invention to provide a liveload assembly that reduces the time required for installing belleville washers on a bolt.

It is another object of the present invention to provide a liveload assembly that simplifies the installation and torquing of belleville washers on gland bolts to liveload the gland follower.

It is another object of the present invention to provide a liveload assembly that quickly installs on a bolt to reduce worker exposure to radiation when installing liveload belleville washers on valves in a nuclear plant.

It is another object of the present invention to provide a liveload assembly that permits retrofit liveloading of valves or pumps without having to replace the gland bolts with longer bolts.

It is another object of the present invention to provide a liveload assembly that reduces reliance on inaccurate torque wrenches used to liveload the stuffing box of a rotary or reciprocating shaft.

It is another object of the present invention to provide a liveload assembly that provides a liveload belleville washer assembly for a gland follower to maintain the compression on the packing in a stuffing box seal of a shaft.

It is another object of the present invention to provide a liveload assembly that provides an indicator flagging a rotary or reciprocating shaft having liveload belleville washers which need to be retorqued.

It is another object of the present invention to reduce hystersis of belleville washers for liveloading bolts.

Still other objects, features and advantages will become apparent upon reading of the following detailed description in conjunction with the drawings and the appended claims.

DETAILED DESCRIPTION OF THE DRAWINGS

Figure 1:
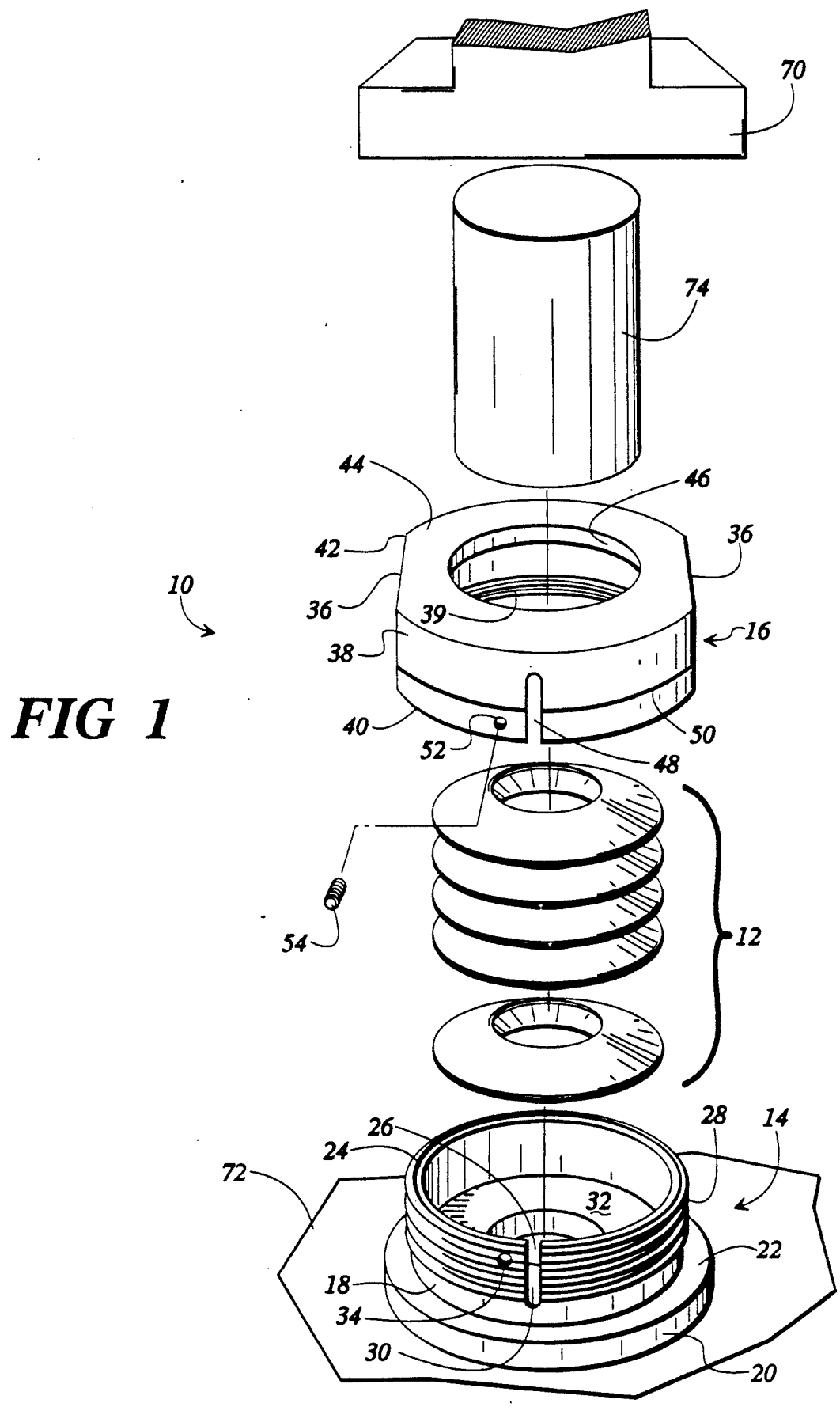
FIG. 1 is a perspective exploded partially cut-away view of a preferred embodiment of a liveload assembly of the present invention, illustrated with a cut-away view of a hydraulic press for compressing the belleville washers held in the assembly.

Referring now in more detail to the drawings, in which like numerals indicate like parts throughout the several views, FIG. 1 illustrates in exploded perspective cut-away view a liveload assembly 10 constructed in accordance with the present invention for holding a plurality of compressed belleville washers 12 within a stack guide 14. A cap 16 retains the compressed belleville washers in the stack guide 14. As discussed below, FIG. 1 illustrates the liveload assembly 10 with a partial view of a hydraulic press used to compress the belleville washers 12 with the cap 16 installed when the assembly is loaded The stack guide 14 comprises an upper cylindrical stem 18 and an integral annular bottom plate 20. The upper end 24 of the stem 18 is open. The diameter of the stem 18 is sized for receiving the belleville washers 12 With close 10 tolerances. The stem 18 includes a thread 28 on the exterior surface extending from the open upper end 24 towards the bottom plate 20. The bottom plate 20 defines an opening 26 which is coaxial with the longitudinal axis of the stack guide 14. The bottom plate 20 is a seat for receiving a stack of belleville washers. As discussed below, a bolt for receiving the liveload assembly 10 is extended through the opening 16. A flange 22 extends outwardly from the bottom plate 20 for supporting the liveload assembly 10, for example, on a gland follower of a fluid flow apparatus. In an alternate embodiment (not illustrated) the side face of the flange 22 is knurled for gripping when installing or removing the liveload assembly.

A slot 30 in the stem 18 extends longitudinally from the upper end 24 towards the bottom plate 20. The slot 30 permits a side view of the belleville washers 12 stacked inside. In the illustrated embodiment, a portion 32 of the bottom plate 20 is thicker inside the stem 18 for supporting the load imposed by the belleville washers 12. The stack guide 14 accordingly defines a cup in which the belleville washers sit. The slot 30 in the illustrated embodiment extends to the upper surface of the portion 32. A bore 34 extends through the wall of the stem 18. The bore 34 is positioned near the slot 30 and is spaced apart from the upper edge of the stem 18 for a purpose discussed below.

The belleville washers 12 are ring-like dished disks which flatten when compressed under force. Manufacturers of belleville washers publish specifications showing the dimensions of the washers and the load carried by the washer under compression at specified percent deflection. The specifications are used to select belleville washers for maintaining torque for a particular installation, as discussed below.

The cap 16 is cylindrical with preferably two flats 36 180° apart on an exterior side wall 38. The flats 36 permit the cap 16 to be gripped by a wrench during installation or removal of the liveload assembly 10 on a bolt, as discussed below. The interior of the cap 16 is threaded with a thread 39 from an open bottom end 40 towards the upper end 42. The inner diameter of the cap 16 is sized to matingly join with the exterior threaded stack guide 14. The upper end 42 is partially closed with an integral annular plate 44 defining an opening 46 coaxial with the longitudinal axis of the cap 16. A longitudinal slot 48 in the side wall 38 extends from the bottom end 40 to the plate 44. The slot 48 provides an opening to view the belleville washers 12 inside the liveload assembly 10 for a purpose discussed below. A groove 50 extends around the side 38 of the cap 16 and is spaced a predetermined distance from the bottom end 40. A threaded bore 52 passes through the side 38 for receiving a set screw 54. The bore 52 is positioned to align with the bore 34 in the stack guide 14 when the slots 48 and 30 align, as discussed below.

FIG. 1 further illustrates a piston 70 and a support 72 in a hydraulic press (not illustrated) which cooperate with a cylindrical rod 74 to load the liveload assembly 10. As will be described in more detail, loading is accomplished by inserting the belleville washers 12 into the stack guide 14, compressing the belleville washers and securing the belleville washers by screwing the cap 16 onto the stack guide. A compressed liveload assembly 10 may then be installed on a bolt to reduce loss of torque. A typical application is to liveload the bolts on a gland follower of fluid flow apparatus such as a pump or valve. For instance, in FIG. 2, there is shown in a cross-sectional view a casing 80 including an embodiment of the precompressed liveload assembly 10 which maintains compressive force on the packing in the stuffing box. The casing 80 is representative of a casing for either a pump or valve. Both fluid flow apparatus may use a stuffing box seal to reduce or eliminate leaks along the shaft. For discussion purposes, the casing 80 will be considered part of a pump having a discharge side 84 and an inlet side 86. A rotatable shaft 88 connects to an impeller (not shown) at one end and to a motor (not shown) at the other end. A bushing 90 supports the rotatable shaft 88 in the pump.

The casing 80 of the pump defines a gland stuffing box 92. The stuffing box 92 defines an annular region 93 through which the shaft 88 extends. Compression packing 94 is held in the annular region 93 of the stuffing box 92 to seal the casing 80 and prevent fluid leakage along the shaft 88. The illustrated embodiment includes a lantern ring 96 which communicates with an aperture 98 for the introduction of lubricants to the packing 94, as necessary.

A gland follower 100 includes an annular flange 102 which inserts in the annular region 93 of the stuffing box 92. The gland follower 100 includes bores 103 A bolt 104 connects to the stuffing box 92 by threadably engaging a bore 105. The bolt 104 passes through one of the bores 103 in the gland follower 100. A nut 106 on each bolt 104 holds the liveload assembly 10 (and 10a shown in cut-away view) securely to the top of the gland follower 100. The compressed belleville washers 12 push against the nut 106 and the gland follower 100 to maintain the compressed load on the packing 94 in the stuffing box 92.

The stack guide 14 accordingly defines a cup in which the belleville washers 12 sit. In a preferred embodiment, the outside diameters of the compressed belleville washers 12 have about 0.015 inch clearance overall to fit in the interior of the stack guide 14. The opening 26 in the bottom 20 of the stack guide 14 is drilled to fit over a gland bolt 104, preferably with about a 0.050 inch clearance.

In a preferred method of loading the liveload assembly 10 of the present invention, the stack guide 14 as shown in FIG. 1 is placed on the support 72. The appropriate number and size of belleville washers 12 are placed inside the stack guide 14. The cap 16 is threaded onto the open upper end 24 of the stack guide 14. A rod 108 is inserted coaxially through the cap 16 to contact the top belleville washer 12 in the stack guide 4. The hydraulic press is activated and the piston 70 moved downward. The piston 70 pushes on the rod 108 compressing the belleville washers 12. A gauge (not illustrated) may be connected to the hydraulic press to provide an indicator, permitting compression of the belleville washers to a specific loading. In a preferred embodiment, the height of the stem 18 between the portion 32 of the bottom plate 20 and the upper end 24 equals the height of the stack of belleville washers compressed to the preferred loading of 75% deflection, as discussed below.

The cap 16 is then turned down onto the stack guide 38 until the bottom surface of the plate 44 contacts the top belleville washer in the stack. Simultaneously, the bottom end 40 of the cap 16 contacts the flange 22 of the stack guide 14. The hydraulic press is then released, withdrawing the piston 70 and the rod 108 is thereafter removed from the liveload assembly 10. The preloaded liveload assembly 10 is ready for storage, shipping and installation on a bolt for resisting bolt creep, such as on a valve or a pump.

Figure 2:
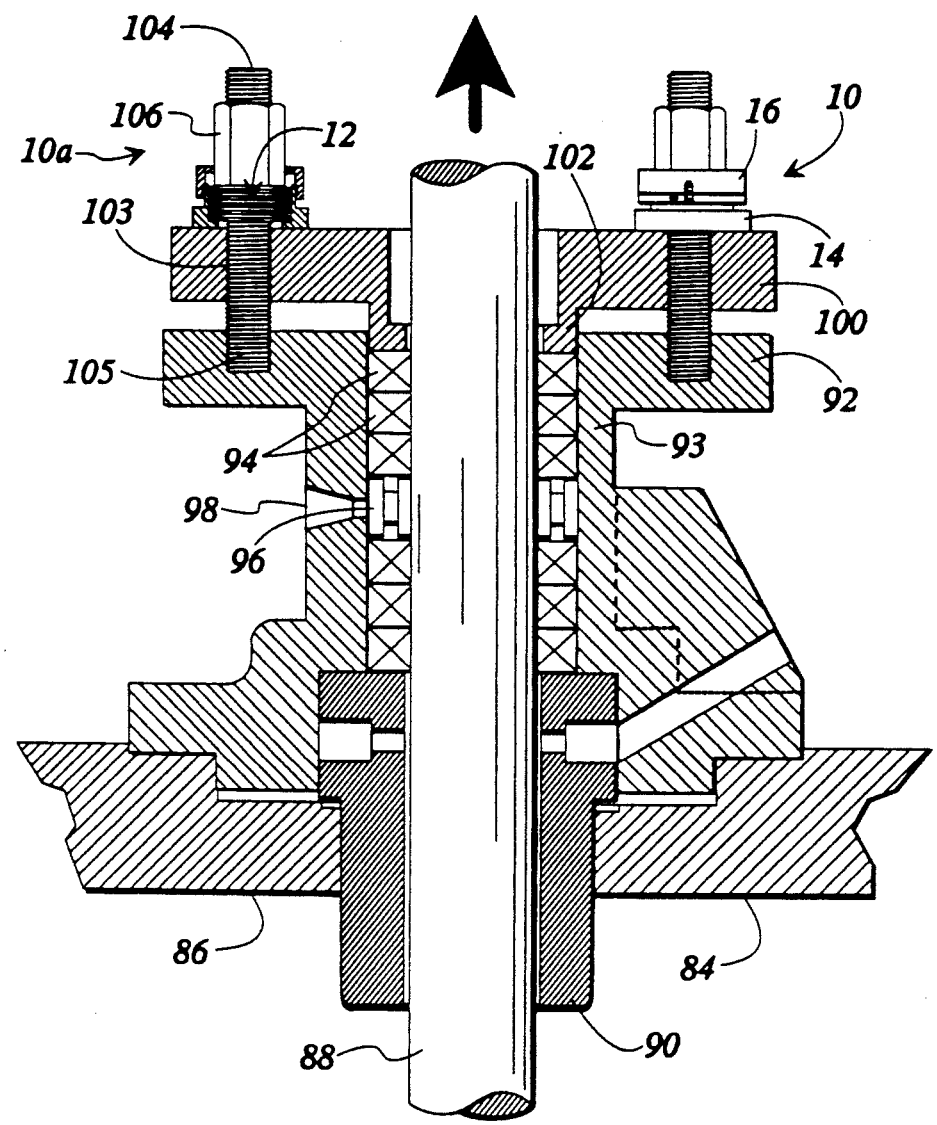
FIG. 2 is a cross-section view of the embodiment of the liveload assembly illustrated in FIG. 1, showing two of the assemblies attached to a gland follower of a stuffing box of a fluid flow device.

With reference to FIG. 2, the gland follower 100 may be liveloaded by first installing the packing 94 in the annular region 93 of the stuffing box 92. The gland follower 100 is then positioned with the annular flange 102 in the open top of the annular region 93 of the stuffing box 92. The bolts 104 align with the bores 103 as the gland follower 100 is positioned on the stuffing box 92. One liveload assembly 10 is positioned over each bolt 104. The gland nut 106 is tightened by hand until it reaches the top of the washers 40. A standard wrench is then used to tighten the gland nut 106 an additional one half to one full turn. This additional turn slightly compresses the belleville washers 12 and relieves the pressure from the belleville washers 12 on the top plate 44 of the cap 16. The cap 16 is then rotated to a second position at which the bore 52 in the cap is aligned with the bore 34 in the stack guide 14. The slots 48 and 30 in the cap 16 and the stack guide 14 likewise align, providing an opening for viewing the position of the stack of belleville washers 12. The cap 16 is fixed in the second position by turning the set screw 54 in the bore 52 into the bore 34. Fixing the cap 16 to the stack guide 14 prevents the cap from inadvertent movement. The groove 50 therefore correctly shows the height to which the stack of belleville washers 12 are to be compressed in order to meet the designed loading for the liveload assembly 10.

As the packing 94 consolidates and compresses, the gland follower 100 is pushed axially by the liveload assemblies 10 and 10a towards the stuffing box 92 to maintain compression on the packing 94. Movement of the gland follower 100 causes the stack guide 14 to move axially with respect to the bolt 104. When the gland follower 100 moves, the compression on the belleville washers 12 lessens. The height of the stack of belleville washers 12 increases relative to the assembly 10. The slots 30 and 48 in the stack guide 38 and cap 16, respectively, permit visual monitoring of the height of the stack of belleville washers 12. This height is an indication of the load provided by the liveload assembly 10. When the height of the stack increases over the predetermined point (i.e., the groove 50), the nut 106 should be tightened to recompress the belleville washers 12.

A preferred embodiment uses belleville springs with linear regressive load deflection such as those manufactured by National Disc Spring Division, Rolex Company, Hillside, New Jersey. Such belleville springs provide a direct correlation between the compression lost by changes in the packing 94 and the movement of the stack guide 14 relative to the gland nut 106 threaded onto the bolt 104. Other types of belleville washers will work with the stack guide 14 and cap 16 of the present invention, but to equate deflection to compression requires reference to a formula or the manufacturer's spring table specifications.

For example, the liveload assembly 10 is designed to apply force to a gland follower of a pump. A data sheet describing the pump specifies the pressure to be held, the diameter of gland bolts, and the type of packing. Based on this information, the type and size of belleville washer is selected by referring to specification sheets published by manufacturers of such washers. The specifications typically show the dimensions of the washer and the load carried by each washer. The dimensions include the inner and outer diameters of the washer, the height of the uncompressed washer, the thickness of the washer, and the loads are specified at various percent deflections.

According to the present invention, the height of the stem 18 defining the cup in which the belleville washers 12 sit is determined by the total height of the stack of belleville washers 12 at 75% deflection. Deflections approaching 100% overstress the washers. As the packing compresses, the gland follower 100 will move under the force applied by the liveload assembly 10. The downward movement of the liveload assembly increases the distance between the bottom 32 of the stack guide 14 and the nut 106 holding the belleville washers 12 in compression. The belleville washers 12 accordingly uncompress to a lesser percent deflection. When the top belleville washer 12 in the stack is seen to be above the groove 50 in the liveload assembly 10, the nut 106 should be retightened. Retightening the nut 106 recompresses the belleville washers 12. The belleville washers are recompressed sufficiently so that the upper belleville washer 12 is level with the groove 50 in the side of the cap 16.

The belleville washer is selected from a number of available washers based on the bolt diameter and the pressure in the fluid flow apparatus. For example, a pump has gland bolts with a one-half inch diameter and the maximum pressure is 100 pounds. An AM281410 spring washer supplied by National Disk Springs Division of Rolex Company, Hillside, New Jersey has an inner diameter of 0.559 inch and an outer diameter of 1.1 inch. The belleville washer accordingly will fit with close tolerances on the gland bolt. The washer provides 114 pounds of load at 25% deflection and 264 pounds at 75% deflection. The height of an uncompressed washer is 0.0709 inches; at 75% compression, the height is reduced 0.0238 inch; at 25% compression, the height is reduced 0.0079 inch.

The depth of the cup in the stack guide 14 equals the number of belleville washers selected for use times the sum of the height less the reduction in height due to the deflection. For example, if eight washers are to be used in the assembly, the depth of the cup is computed as follows:

$$8 \text{ washers} \times (0.0709 - 0.0238 \text{ inches}) = 0.3768 \text{ inches}$$

The diameter of the opening 26 in the bottom plate 20 is preferably 0.050 inch greater than the inner diameter of the washer to provide bolt clearance, or in this example, equal to 0.609 inch. The larger inner diameter of the stack guide 14 is preferably about 0.015 inches greater than the outer diameter of the washer, or 1.115 inches.

The interior dimensions of the retainer cap 16 may then be determined. The groove 50 is cut as a marker at a selected distance above the bottom edge 40. In the illustrated embodiment, the groove 50 is 0.2 inch above the bottom edge 40. The groove 50 corresponds to the height of the stack of belleville washers 12 at 75% deflection. The belleville washers 12 will uncompress to a predetermined minimum acceptable deflection. In this example, the minimum acceptable deflection is 25%. The distance from the groove 50 to the inside surface of the annular plate 44 accordingly is the difference in the height of the stack at 75% deflection and 25% deflection. In the present example, the distance equals 0.1295 inch.

The structure of the present invention accordingly facilitates a compact liveload assembly 10. The liveload assembly 10 is particularly suited for installation on valves and pumps used in nuclear plants. The device 10 readily fits on existing bolts securing the gland follower to the stuffing box. Generally, the gland bolt does not have to be replaced with a longer bolt as may be the case when uncompressed belleville washers are positioned over the bolt.

Further, the liveload assembly 10 of the present invention may be installed more quickly on valves and pumps than manual methods of installing belleville washers. Installation and compression of belleville washers on a valve or pump may take as much as one hour or more to position the belleville washers and to compress them to the proper specified load using torque wrenches. Installation of the liveload assembly 10 according to the present invention however, is direct, rapid and trouble free. Significant time and labor cost savings may be gained by using the liveload assembly 10. Further, the packing in properly loaded valves and pumps has a significantly longer life than packing in valves and pumps without liveloading.

The principles, preferred embodiments and modes of operation of the present invention have been described in the foregoing specification. The invention is not to be construed as limited to the particular forms disclosed, because these are regarded as illustrious rather than restrictive. Moreover, variations and changes may be made by those skilled in the art without departing from the spirit of the invention as set forth by the following claims.

What is claimed is:

1. A liveload assembly for communicating force to an axially translatable gland follower which compresses packing in a stuffing box of a fluid flow apparatus, comprising:
   a cylindrical cup having a thread extending from a first end on an exterior side surface and an annular seat at a second end defining an opening for receiving therethrough a bolt extending from the stuffing box;
   a plurality of compressible belleville washers stacked inside the cup on the seat; and
   a retainer cap having a thread extending from a first end on an interior side surface of the cap and an annular plate at a second end of the cap defining an opening for receiving therethrough the bolt and a nut for threading on the bolt, the annular plate of the retainer cap contacting and holding the compressible belleville washers in compression by screwing the cap onto the cup to a first position;
   whereby the compressed force of the belleville washers is applied to the gland follower by threading the nut on the bolt to contact the stack of belleville washers and unscrewing the retainer cap to a second position out of contact with the stack of belleville washers.

2. The liveload assembly as recited in claim 1, further comprising:
   a groove fixed in an exterior side surface of the retainer cap a predetermined distance from the first end of the cap;
   the side surface defining a longitudinally disposed slot; and
   a set screw received in a threaded bore through the side surface;
   whereby the retainer cap, being fixed in the second position by turning the set screw in the bore against the side surface of the cap, enables the groove to indicate relative movement of the gland follower by viewing the stack of belleville washers through the slot.

3. The liveload assembly as recited in claim 1, wherein the height of the cup between an upper edge and the annular seat equals the height of the belleville washers at about 75% deflection.

4. A liveload assembly for communicating force to an axially translatable gland follower which compresses packing in a stuffing box of a fluid flow apparatus, comprising:
   a cylindrical cup having a thread extending on an exterior side surface a predetermined distance from a first end and an annular seat at a second end defining an opening for receiving therethrough a bolt extending from the stuffing box;
   a plurality of compressible belleville washers stacked inside the cup on the seat;
   a retainer cap having a thread extending on an interior side surface a predetermined distance from a first end of the cap and an annular seat at a second end of the cap defining an opening for receiving therethrough the bolt and a nut for threading on the bolt, the side surface defining a longitudinally disposed slot, the annular seat of the retainer cap contacting and holding the compressible belleville washers in compression by screwing the cap onto the cup a predetermined distance;
   a mark fixed in an exterior side surface of the retainer cap a predetermined distance from the first end of the cap;
   a set screw received in a threaded bore through the side surface;
   whereby the compressed force of the belleville washers is applied to the gland follower by threading the nut on the bolt to contact the stack of belleville washers and unscrewing the retainer cap a predetermined distance from contact with the stack of belleville washers;
   the retainer cap fixed in the second unscrewed position by turning the set screw in the bore against the side surface of the cap so that the mark indicates relative movement of the gland follower by viewing the stack of belleville washers through the slot.

5. A method of monitoring the compression of packing in a stuffing box by a gland follower comprising:

placing a liveload assembly on a bolt extending upwardly from the stuffing box through the gland follower, the liveload assembly comprising:

a cylindrical cup having a thread extending from a first end on an exterior side surface and an annular seat at a second end defining an opening for receiving therethrough the bolt;

a plurality of compressible belleville washers stacked inside the cup on the seat; and a retainer cap having a thread extending from a first end on an interior side surface of the cap and an annular plate at a second end of the cap defining an opening for receiving therethrough the bolt, the annular plate of the retainer cap contacting and holding the compressible belleville washers in compression by screwing the cap onto the cup;

connecting the stack of belleville washers with a nut threaded on the bolt;

releasing the retainer cap from contact with the stack of belleville washers;

fixing the retainer cap to the cup at a second predetermined position by turning a set screw through a bore in the retainer cap against the cup; and monitoring the compression of the packing by observing relative movement of the belleville spring with respect to the cup.

* * * * *